United States Patent
Schmid et al.

(10) Patent No.: US 11,848,597 B2
(45) Date of Patent: Dec. 19, 2023

(54) ELECTRIC MOTOR WITH DEEP DRAWN MOTOR HOUSING

(71) Applicant: NIDEC Motors & Actuators (Germany) GmbH, Bietigheim-Bissingen (DE)

(72) Inventors: Jürgen Schmid, Brackenheim (DE); Thomas Kübler, Untergruppenbach (DE); Matthias Fischer, Besigheim (DE)

(73) Assignee: NIDEC Motors & Actuators (Germany) GmbH, Bietigheim-Bissingen (DE)

( * ) Notice: Subject to any disclaimer, the term of this patent is extended or adjusted under 35 U.S.C. 154(b) by 0 days.

(21) Appl. No.: 17/591,204

(22) Filed: Feb. 2, 2022

(65) Prior Publication Data

US 2022/0247263 A1  Aug. 4, 2022

(30) Foreign Application Priority Data

Feb. 3, 2021  (DE) .......................... 102021102499.4

(51) Int. Cl.
*H02K 5/22* (2006.01)
*H02K 5/24* (2006.01)
*H02K 11/33* (2016.01)
*H02K 5/04* (2006.01)

(52) U.S. Cl.
CPC ...................................... *H02K 5/22* (2013.01)

(58) Field of Classification Search
CPC . H02K 5/22; H02K 5/24; H02K 11/33; H02K 5/04
USPC .................................. 310/89, 400, 402, 405
See application file for complete search history.

(56) References Cited

U.S. PATENT DOCUMENTS

2021/0354678 A1  11/2021  Weimar

FOREIGN PATENT DOCUMENTS

| DE | 10 2010 062 822 A1 | 6/2012 | |
| DE | 10 2018 217 558 A1 | 4/2020 | |
| WO | 2020/096191 A1 | 5/2020 | |
| WO | WO-2020096191 A1 * | 5/2020 | ............. H02K 21/16 |
| WO | WO-2022122087 A1 * | 6/2022 | |

* cited by examiner

*Primary Examiner* — Jose A Gonzalez Quinones
(74) *Attorney, Agent, or Firm* — Keating & Bennett, LLP

(57) ABSTRACT

An electric motor with a deep-drawn motor housing including a flange adjoining an opening, the flange being polygonal or substantially polygonal in cross section with flange corners each including a screw-on point, each of the flange corners includes two embossments which define a bending edge of the motor housing between the screw-on point and an opening of the motor housing.

10 Claims, 4 Drawing Sheets

ELECTRIC MOTOR WITH DEEP DRAWN MOTOR HOUSING

CROSS REFERENCE TO RELATED APPLICATION

The present application claims priority under 35 U.S.C. § 119 to German Application No. 10 2021 102 499.4, filed on Feb. 3, 2021, the entire contents of which are hereby incorporated herein by reference.

1. FIELD OF THE INVENTION

The present disclosure relates to an electric motor.

2. BACKGROUND

Electric motors, which are referred to as internal rotor motors, have a rotor that contains a motor shaft and is rotatably mounted in a housing. The rotor is provided with permanent magnets. A stator is arranged around the motor, which carries a number of windings on an iron core. When suitably controlled, the windings generate a magnetic field that drives the rotor to rotate. The windings are usually of a three-phase design and are accordingly provided with three electrical connections via which the windings can be connected to a control unit (ECU). The winding ends are contacted via busbars, which may be encapsulated in a busbar assembly.

Such electric motors often have a deep-drawn motor housing. When designing the interface between the motor housing and the internal components of the electric motor, it should be noted that the internal forces acting on the overall system may additionally be superimposed by external forces. This can occur, for example, due to strong acceleration of the overall system. Therefore, when connecting the system assemblies, it is important to achieve good mechanical rigidity so that the torques and forces occurring during operation of the electric motor do not lead to deformation or deflection of the motor housing.

SUMMARY

Example embodiments of the present disclosure provide electric motors each with a motor housing that has particularly good mechanical rigidity.

For the purpose of geometrical description of the electric motor, with respect to the longitudinal axis of a motor housing, reference is made to a radial direction which indicates the distance from the longitudinal axis, and a circumferential direction which is defined tangentially to a certain radius arranged in the radial direction.

An example embodiment of a motor of the present invention is an electric motor with a deep-drawn motor housing including a flange adjoining an opening, the flange has a polygonal or substantially polygonal cross section, and flange corners each being assigned a screw-on point, each flange corner including two stampings each defining a bending edge of the motor housing between the screw-on point and the opening.

The stampings shift the bending edge away from the opening towards the screw-on points, making the flange much more mechanically stable.

In an example embodiment of the present invention, the stampings define support surfaces of a busbar assembly of the electric motor. The position of the busbar assembly is thus clearly defined and additional fastening options do not have to be created in the motor housing. Preferably, a support surface is provided in a bottom of each embossment.

The motor housing is preferably a pot-shaped body with a cylindrical or substantially cylindrical outer surface, a closed, continuous bottom and an opening opposite the bottom. The motor housing is thus open on one side only and surrounds a rotor and a stator. The stator is preferably completely surrounded by the motor housing in the axial direction.

It is advantageous if each embossment assumes approximately the shape of a right-angled triangle in cross-section, with the side opposite the right angle being defined by the opening of the motor housing and the other two sides extending parallel or substantially parallel to the outer sides of the flange. Preferably, the two embossments of a flange corner are spaced apart from each other and have mirror symmetry with respect to an axis of symmetry passing through the screw-on point and the longitudinal axis of the motor housing.

It is preferable if a rectangular envelope of the two embossments of a flange corner encloses the corresponding screw-on point, the screw-on point being located in the radially outer corner of the envelope.

Preferably, the outer sides of the flange in the region of the screw-on point as well as the sides of the embossments close to the screw-on point with extensions enclose an imaginary square, with the screw-on point being in the center of the imaginary square. Preferably, the imaginary square defines a flat area with a size corresponding to a diameter of a fastener provided for the screw-on point.

Preferably, the electric motor is an internal rotor motor whose rotor is provided with magnets and which is surrounded by a stator carrying a number of windings on an iron core, the winding ends being electrically contacted via the busbar assembly.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the disclosure are explained in more detail below with reference to the drawings. Similar or similarly acting components are designated in the figures with the same reference signs.

DETAILED DESCRIPTION

Figure 1:
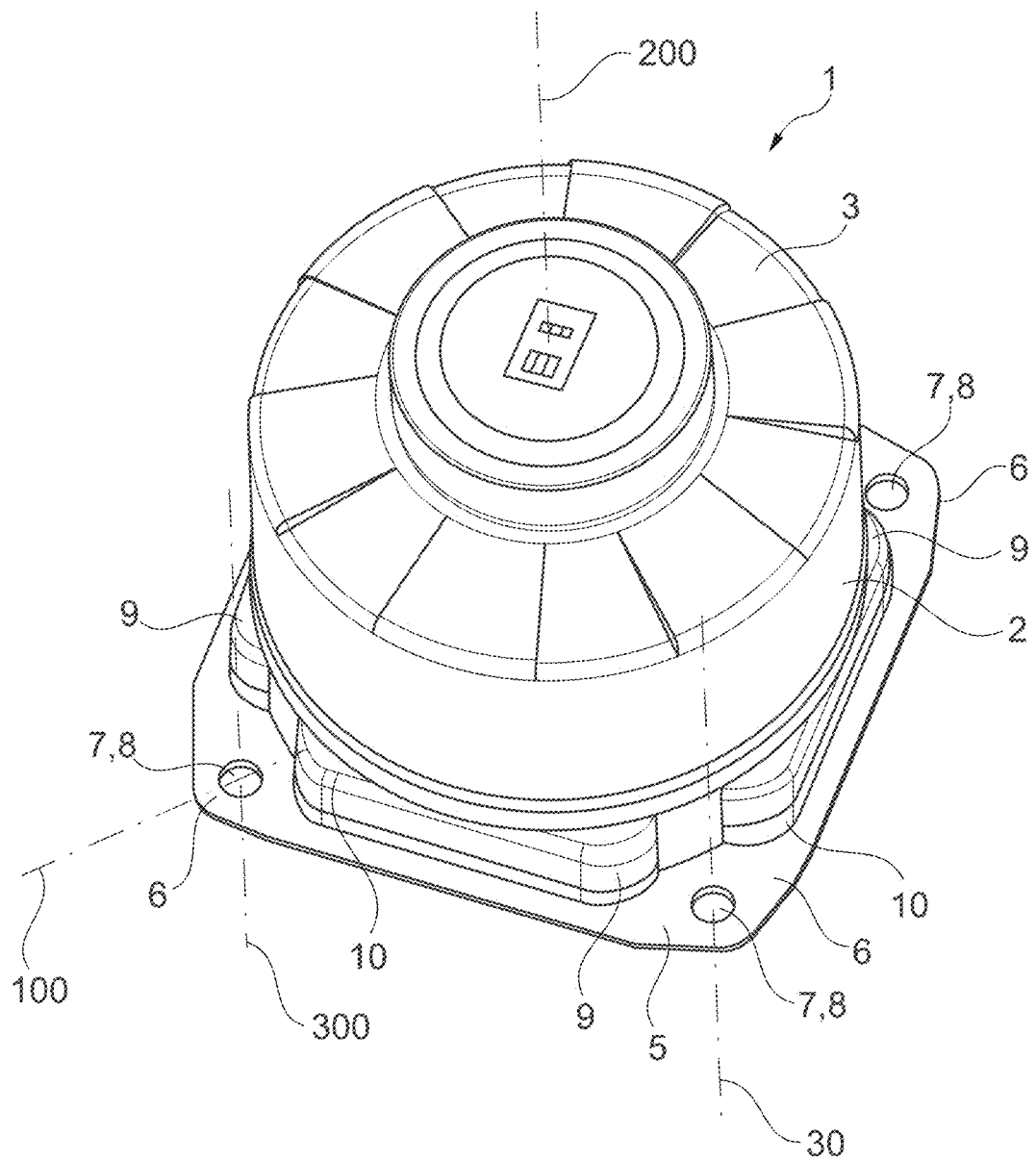
FIG. 1 shows a spatial view from below of a motor housing of an electric motor according to an example embodiment of the present invention.

FIG. 1 shows a deep-drawn motor housing 1 of an electric motor. The motor housing 1 is a pot-shaped body with a substantially cylindrical outer surface 2, a closed, continuous bottom 3 and an opening opposite the bottom 3. The opening is circumferentially surrounded by a flange 5. The flange 5 has a substantially rectangular base area with four flange corners 6, only three of which are shown in the figure.

In each of these flange corners 6, which are evenly distributed in the circumferential direction, an interspersing bore 7 is provided as a screw-on point 8. In the area of the flange corners 6, the flange 5 also has embossments 9, 10 extending downward in the direction of the bottom 3. Two embossments 9, 10 are associated with each flange corner 6, which are arranged in mirror symmetry with respect to an axis of symmetry 100 that connects the central axis or longitudinal axis of the motor housing 200 and the central axis of the corresponding screw-on point 300 perpendicular thereto. The two embossments 9,10 of a flange corner are spaced apart from each other in the circumferential direction.

Figure 2:
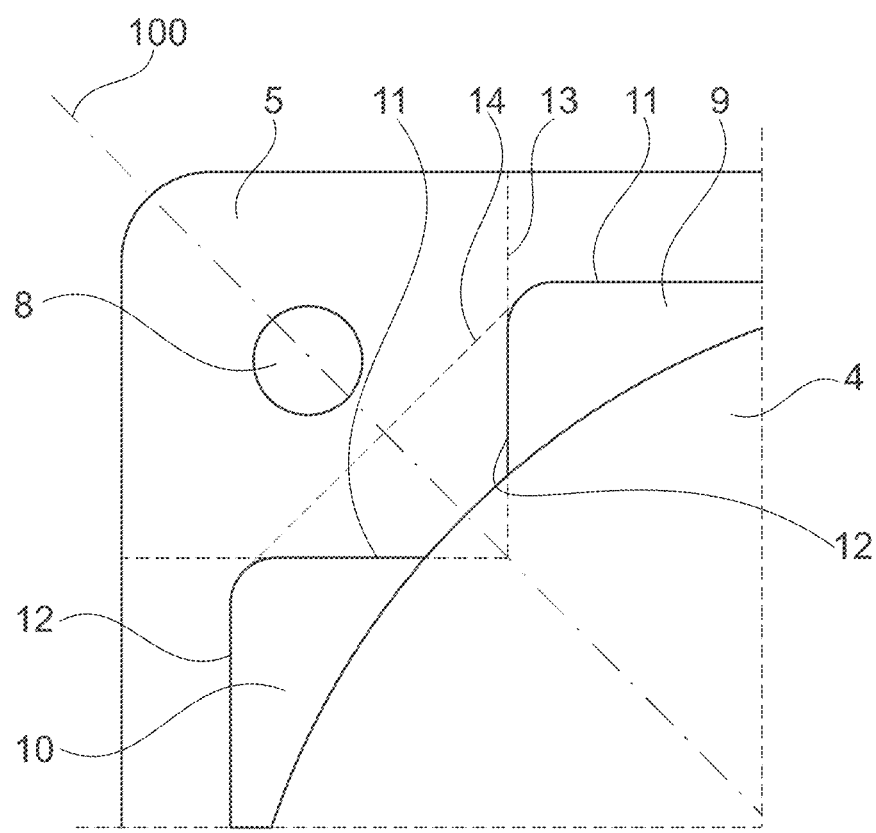
FIG. 2 shows a schematic representation of a corner of the motor housing of FIG. 1 in plan view from above.

As can be seen in detail in FIG. 2, a respective embossment 9,10 has in cross-section two limiting sides 11,12 which enclose a right angle. The two sides 11,12 extend parallel to the outer sides of the flange 5. The embossments 9,10 join the opening inwardly in the radial direction. Each embossment 9,10 takes approximately the shape of a triangle in cross-section, with the side opposite the right angle formed by the opening of the motor housing 4. A rectangular envelope of the two embossments of a flange corner 9,10 encloses the corresponding screw-on point 8, the screw-on point 8 being arranged lying in the radially outermost corner of the envelopes. The outer sides of the flange in the area of the screw-on point as well as the sides of the embossments close to the screw-on point form with their extensions an imaginary square 13, in the center of which the screw-on point is arranged. The otherwise conventional cylindrical geometry at the screw-on points is eliminated. The imaginary square 13 defines a flat area, the size of which is adapted to the diameter of the screw head that engages through the hole or its washer, the area being connected as far as possible directly to the opening of the engine housing.

A direct connection of the right angles of the embossments of a flange corner 14 is aligned parallel to a tangent of the opening 3 at the level of the symmetry axis 100 and lies in the radial direction between the screw-on point 8 and the opening 3.

The bending stress at the screw-on points 8 is reduced by the embossments 9,10. Even with a low material thickness or wall thickness, a high mechanical stiffness of the motor housing can be achieved in the critical area of the screw-on points 8.

Figure 3:
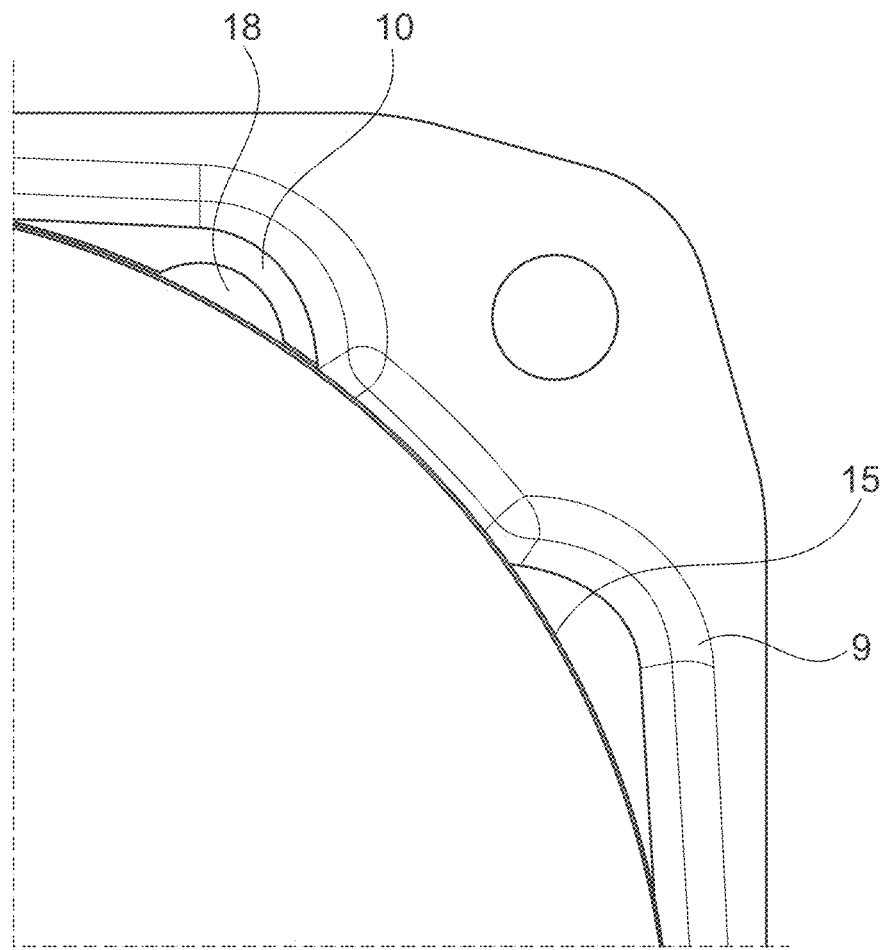
FIG. 3 shows a perspective view from above of a corner area of the motor housing of FIG. 1 with the busbar assembly inserted into the motor housing.
Figure 4:
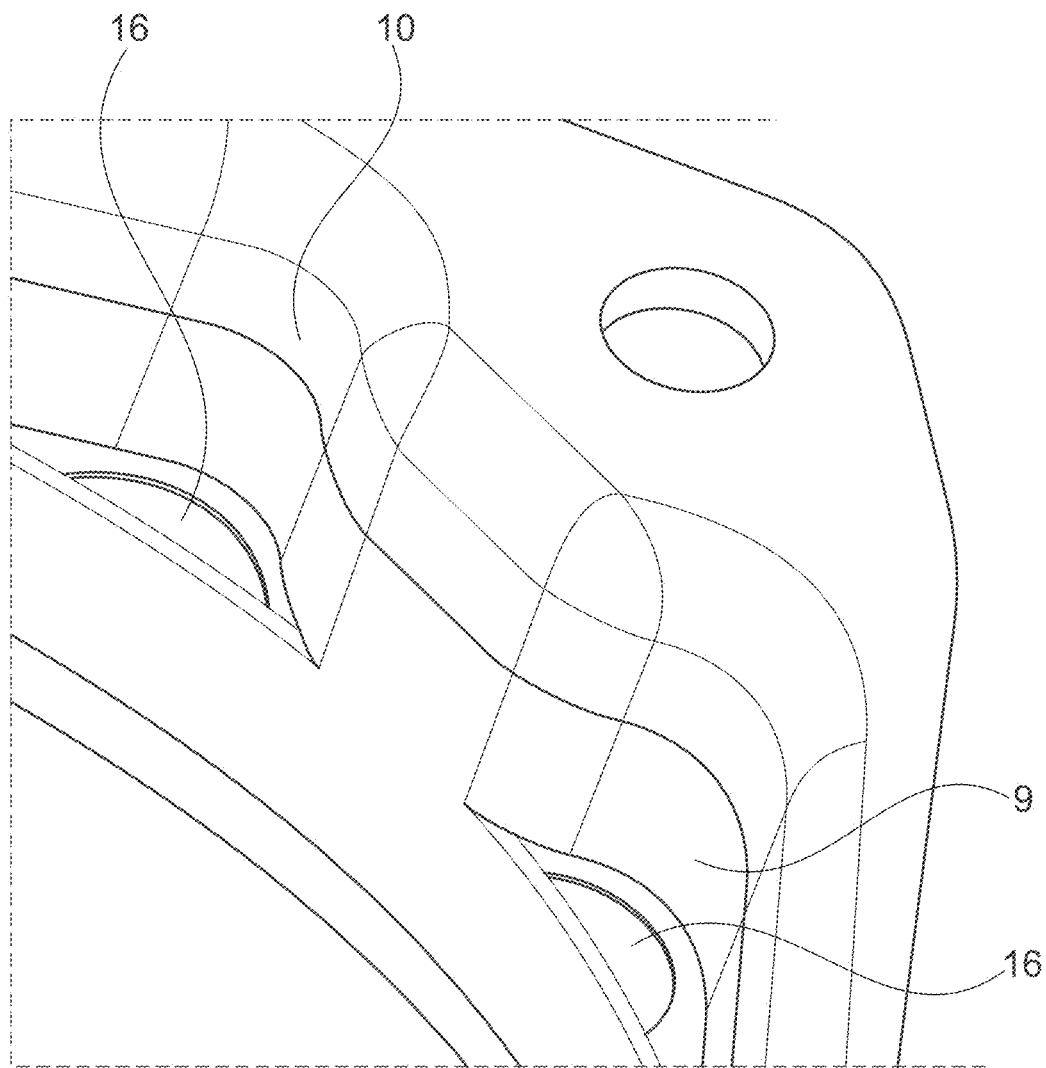
FIG. 4 shows a perspective view of the corner area of FIG. 1 without the busbar assembly.

As shown in FIG. 3, the embossments 9,10 can serve as axial support surfaces for a busbar assembly 15 of the electric motor. In order to optimize the alignment of the busbar assembly 15, which is produced by injection molding, the support surfaces 16 are subsequently machined into a base of the embossments 9, 10, in particular by a stamping process (see FIG. 4). The stamping process may include a final finishing process. Depending on how deeply the bearing surfaces 16 are worked into the embossments 9,10, they can also ensure radial securing of the busbar assembly 15. The bearing surfaces 16 extend radially away from the opening and are approximately semi-circular in shape. Each embossment 9,10 has a bearing surface 16. The busbar assembly 15 has protrusions 18 which, as can be seen from FIG. 3, rest only on every other bearing surface. However, it is also conceivable to select a different number of protrusions for bearing on the bearing surfaces.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor, comprising:
   a deep-drawn motor housing including a flange adjoining an opening; and
   a busbar assembly to house busbars; wherein
   the flange has a polygonal or substantially polygonal cross section;
   corners of the flange each include a respective screw-on point and two embossments, the two embossments each define a bending edge of the motor housing between the screw-on point and an opening in the motor housing;
   the embossments define bearing surfaces to support protrusions of the busbar assembly; and
   the protrusions of the bulbar assembly are only provided for every other one of the embossments around a circumference of the electric motor.

2. The electric motor according to claim 1, wherein a support surface is provided in bottoms of the two embossments.

3. The electric motor according to claim 1, wherein each of the two embossments is substantially in a shape of a right angled triangle in cross-section, with a side opposite to the right angle being defined by the opening of the motor housing and two remaining sides extending parallel or substantially parallel to outer sides of the flange.

4. The electric motor according to claim 3, wherein a rectangular envelope of the two embossments of a flange corner encloses the screw-on point, the screw-on point located in a radially outermost corner of the envelope.

5. The electric motor according to claim 3, wherein the outer sides of the flange adjacent to the screw-on point and the two sides of the embossments adjacent to the screw-on point enclose with their extensions an imaginary square, the screw-on point being in a center of the imaginary square.

6. The electric motor according to claim 5, wherein the imaginary square defines a planar area with a size corresponding to a diameter of a fastener provided to the screw-on point.

7. The electric motor according to claim 1, wherein the bearing surfaces are each produced by a forming process.

8. The electric motor according to claim 7, wherein the forming process includes a final finishing operation.

9. The electric motor according to claim 1, wherein the protrusions and the bearing surfaces are directly axially opposed to one another.

10. The electric motor according to claim 1, wherein portions of the protrusions are radially and circumferentially spaced away from the embossments.

* * * * *